US012811708B2

(12) United States Patent
Maraghechi et al.

(10) Patent No.: US 12,811,708 B2
(45) Date of Patent: Nov. 24, 2026

(54) EFFICIENT HIGHER LOSS BUDGET PON TRANSCEIVER

(71) Applicant: Nokia Solutions and Networks Oy, Espoo (FI)

(72) Inventors: Pouya Maraghechi, Ottawa (CA); Sheldon Walklin, Ottawa (CA)

(73) Assignee: Nokia Solutions and Networks Oy, Espoo (FI)

( * ) Notice: Subject to any disclaimer, the term of this patent is extended or adjusted under 35 U.S.C. 154(b) by 238 days.

(21) Appl. No.: 18/516,872

(22) Filed: Nov. 21, 2023

(65) Prior Publication Data

US 2025/0167911 A1 May 22, 2025

(51) Int. Cl.

*H04J 14/02* (2006.01)
*H04B 10/2513* (2013.01)
*H04B 10/27* (2013.01)

(52) U.S. Cl.

CPC ...... *H04J 14/0221* (2013.01); *H04B 10/2513* (2013.01); *H04B 10/27* (2013.01)

(58) Field of Classification Search

CPC .. H04J 14/0221; H04B 10/2513; H04B 10/27

(Continued)

(56) References Cited

U.S. PATENT DOCUMENTS 9,602,206 B2 * 3/2017 Stiscia ............... H04B 10/2575
9,621,295 B1 * 4/2017 Sandstrom ......... H04Q 11/0067

(Continued)

FOREIGN PATENT DOCUMENTS

EP 3065312 A1 9/2016
EP 3379745 A1 9/2018

OTHER PUBLICATIONS

N. Chand, K. McNeill, S. Kumar and B. Eteson, "An approach to reducing SWAP and cost for avionics high-speed optical data networks," MILCOM 2008—2008 IEEE Military Communications Conference, San Diego, CA, USA, 2008, pp. 1-7, doi: 10.1109/MILCOM.2008.4753047.

(Continued)

*Primary Examiner* — Dalzid E Singh

(74) *Attorney, Agent, or Firm* — Tong, Rea, Bentley & Panagos, LLC

(57) ABSTRACT

Various example embodiments for supporting optical communications in an optical communication system may be configured to leverage fiber loss properties of optical fibers to support improved optical communications in various types of optical communication systems, such as passive optical networks (PONs) or other suitable types of optical communication systems. Various example embodiments for leveraging fiber loss properties of optical fibers for improved optical communications in PONs may be configured to improve PON optical distribution network reach and loss characteristics, while achieving use of lower cost and lower power consumption solutions as compared with conventional approaches for PON systems, based on an apparatus including a receiver configured to operate using a receiver sensitivity specified for an optical module class for passive optical networks and a transmitter configured to operate using a transmit power that is less than a transmit power specified for the optical module class for passive optical networks.

20 Claims, 7 Drawing Sheets

(58) Field of Classification Search
USPC .......................................................... 398/140
See application file for complete search history.

(56) References Cited

U.S. PATENT DOCUMENTS

| | | | | |
|---|---|---|---|---|
| 2009/0169209 | A1* | 7/2009 | Sugawara | H04B 10/27 398/75 |
| 2012/0106952 | A1* | 5/2012 | Xu | H04Q 11/0067 398/28 |
| 2013/0294776 | A1 | 11/2013 | Cheng | |
| 2018/0198552 | A1* | 7/2018 | Cress | H04B 10/07955 |
| 2020/0295845 | A1 | 9/2020 | Funada | |
| 2021/0194589 | A1* | 6/2021 | Kawakita | H04L 12/44 |
| 2022/0321245 | A1 | 10/2022 | Jia | |

OTHER PUBLICATIONS

Chia-Chien Wei et al., "32-dB loss budget high-capacity OFDM long-reach PON over 60-km transmission without optical amplifier," OFC 2014, San Francisco, CA, USA, 2014, pp. 1-3, doi: 10.1364/OFC.2014.Th3G.1.

H. Y. Chen, C. C. Wei, I. C. Lu, H.-H. Chu, Y. C. Chen and J. Chen, "High-capacity and high-loss-budget OFDM long-reach PON without an optical amplifier [invited]," in Journal of Optical Communications and Networking, vol. 7, No. 1, pp. A59-A65, Jan. 2015, doi: 10.1364/JOCN.7.000A59.

Extended European Search Report in corresponding EP Application No. 24211457.7-1206, dated Apr. 17, 2025, 10 pages.

Du, et al., "Long-Reach Wavelength-Routed TWDM PON: Technology and Deployment," Journal of Lightwave Technology, vol. 37, No. 3, Feb. 1, 2019, 10 pages.

Wang, et al., "Considerations about 50G upstream PMD specification," International Telecommunication Union, Telecommunication Standardization Sector, Rapporteur Group Meeting—Contribution, China Mobile Communications Corporation, Huawei Technologies Co., Ltd., Study Group 15, Apr. 26-28, 2022, 4 pages.

Rosales, et al., "Achieving high budget classes in the downstream link of 50G-PON," Journal of Optical Communications and Networking, vol. 13, No. 8, Aug. 2021, 9 pages.

* cited by examiner

EFFICIENT HIGHER LOSS BUDGET PON TRANSCEIVER

TECHNICAL FIELD

Various example embodiments relate generally to optical communication systems and, more particularly but not exclusively, to supporting communications in passive optical networks (PONs).

BACKGROUND

Various communications technologies may be used to support communications in various types of communication systems.

SUMMARY

In at least some example embodiments, an apparatus includes a receiver configured to operate using a receiver sensitivity specified for an optical module class for passive optical networks, and a transmitter configured to operate using a transmit power that is less than a transmit power specified for the optical module class for passive optical networks. In at least some example embodiments, the apparatus is configured such that a dispersion penalty at a particular distance is equal to or less than a maximum specified value. In at least some example embodiments, the apparatus is configured to support execution of a dispersion penalty test to measure a dispersion penalty at a particular distance. In at least some example embodiments, the dispersion penalty test is configured to confirm that the dispersion at the particular distance is equal to or less than a maximum specified value. In at least some example embodiments, the optical module class for the passive optical networks includes one of Class A, Class B, Class B+, Class N1, Class N2, Class C, Class C+, Class D, Class E1, or Class E2. In at least some example embodiments, the optical module class for the passive optical networks comprises Class D, the transmit power specified for Class D is +8 dBm, and the transmitter is configured to operate using a transmit power of +5 dBm. In at least some example embodiments, the apparatus comprises a passive optical network module. In at least some example embodiments, the passive optical network module is configured to support a single passive optical network. In at least some example embodiments, the passive optical network module is configured to support multiple passive optical networks. In at least some example embodiments, the apparatus comprises an optical line terminal for a passive optical network.

In at least some example embodiments, a non-transitory computer-readable medium stores computer program instructions which, when executed by an apparatus, cause the apparatus at least to perform receiving, by a receiver configured to operate using a receiver sensitivity specified for an optical module class for passive optical networks, upstream signals from one or more optical network units, and transmitting, by a transmitter configured to operate using a transmit power that is less than a transmit power specified for the optical module class for passive optical networks, downstream signals toward the one or more optical network units. In at least some example embodiments, a dispersion penalty at a particular distance is equal to or less than a maximum specified value. In at least some example embodiments, the computer program instructions which, when executed by the apparatus, cause the apparatus at least to perform supporting execution of a dispersion penalty test to measure a dispersion penalty at a particular distance. In at least some example embodiments, the dispersion penalty test is configured to confirm that the dispersion at the particular distance is equal to or less than a maximum specified value. In at least some example embodiments, the optical module class for the passive optical networks includes one of Class A, Class B, Class B+, Class N1, Class N2, Class C, Class C+, Class D, Class E1, or Class E2. In at least some example embodiments, the optical module class for the passive optical networks comprises Class D, the transmit power specified for Class D is +8 dBm, and the transmit power is +5 dBm. In at least some example embodiments, the non-transitory computer-readable medium is disposed within a passive optical network module. In at least some example embodiments, the passive optical network module is configured to support a single passive optical network. In at least some example embodiments, the passive optical network module is configured to support multiple passive optical networks. In at least some example embodiments, the non-transitory computer-readable medium is disposed within an optical line terminal for a passive optical network.

In at least some example embodiments, a method includes receiving, by a receiver configured to operate using a receiver sensitivity specified for an optical module class for passive optical networks, upstream signals from one or more optical network units, and transmitting, by a transmitter configured to operate using a transmit power that is less than a transmit power specified for the optical module class for passive optical networks, downstream signals toward the one or more optical network units. In at least some example embodiments, a dispersion penalty at a particular distance is equal to or less than a maximum specified value. In at least some example embodiments, the method further includes supporting execution of a dispersion penalty test to measure a dispersion penalty at a particular distance. In at least some example embodiments, the dispersion penalty test is configured to confirm that the dispersion at the particular distance is equal to or less than a maximum specified value. In at least some example embodiments, the optical module class for the passive optical networks includes one of Class A. Class B, Class B+, Class N1, Class N2, Class C, Class C+, Class D, Class E1, or Class E2. In at least some example embodiments, the optical module class for the passive optical networks comprises Class D, the transmit power specified for Class D is +8 dBm, and the transmit power is +5 dBm. In at least some example embodiments, the method is performed by a passive optical network module. In at least some example embodiments, the passive optical network module is configured to support a single passive optical network. In at least some example embodiments, the passive optical network module is configured to support multiple passive optical networks In at least some example embodiments, the method is performed at an optical line terminal for a passive optical network.

In at least some example embodiments, an apparatus includes means for receiving, by a receiver configured to operate using a receiver sensitivity specified for an optical module class for passive optical networks, upstream signals from one or more optical network units, and transmitting, by a transmitter configured to operate using a transmit power that is less than a transmit power specified for the optical module class for passive optical networks, downstream signals toward the one or more optical network units. In at least some example embodiments, a dispersion penalty at a particular distance is equal to or less than a maximum specified value. In at least some example embodiments, the apparatus further includes means for supporting execution of a dispersion penalty test to measure a dispersion penalty at a particular distance. In at least some example embodiments, the dispersion penalty test is configured to confirm that the dispersion at the particular distance is equal to or less than a maximum specified value. In at least some example embodiments, the optical module class for the passive optical networks includes one of Class A, Class B, Class B+, Class N1, Class N2, Class C, Class C+, Class D, Class E1, or Class E2. In at least some example embodiments, the optical module class for the passive optical networks comprises Class D, the transmit power specified for Class D is +8 dBm, and the transmit power is +5 dBm. In at least some example embodiments, the method is performed by a passive optical network module. In at least some example embodiments, the passive optical network module is configured to support a single passive optical network. In at least some example embodiments, the passive optical network module is configured to support multiple passive optical networks In at least some example embodiments, the method is performed at an optical line terminal for a passive optical network.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for supporting optical communications in an optical communication system are presented herein. Various example embodiments may be configured to leverage fiber loss properties of optical fibers to support improved optical communications in various types of optical communication systems, such as in passive optical networks (PONs) or other suitable types of optical communication systems. Various example embodiments for leveraging fiber loss properties of optical fibers for improved optical communications in PONs may be configured to improve PON optical distribution network (ODN) reach and loss characteristics while achieving use of lower cost and lower power consumption solutions as compared with conventional approaches for PON systems. Various example embodiments for leveraging fiber loss properties of optical fibers for improved optical communications in PONs may be configured to exploit the asymmetry between downstream loss and upstream loss that may be present in single-mode fibers when the PON wavelengths are sufficiently separated, as will be the case in various types of PONs (e.g., gigabit-capable PONs (GPONs), XG-PON, XGS-PONs, or the like, as well as various combinations thereof). Various example embodiments for leveraging fiber loss properties of optical fibers for improved optical communications in PONs may be applied in various types of PONs (e.g., GPONs, XGS-PONS, or the like, as well as various combinations thereof) for supporting various types of PON applications (e.g., extended reach PON applications, a high margin PON applications, or the like, as well as various combinations thereof). Various example embodiments for leveraging fiber loss properties of optical fibers for improved optical communications in PONs may be applied to achieve various PON optical distribution network (ODN) classes, including various ODN classes which may be standardized by the International Telecommunication Union-Telecommunications Sector (ITU-T) organization (e.g., Class D, Class E1, Class E2, or the like), various other ODN classes which may be standardized by standards organizations other than ITU-T, various other ODN classes which may be adopted or accepted by the industry even though not standardized by any standards organization, various other ODN classes that might otherwise not be possible due to OLT transmit power limitations, or the like, as well as various combinations thereof. Various example embodiments for leveraging fiber loss properties of optical fibers for improved optical communications in PONs may be applied to achieve various PON ODN classes for various types of PON modules (e.g., single-PON modules (SPMs), multi-PON modules (MPMs), or the like) which may be utilized within PONs. It will be appreciated that these and various other example embodiments and advantages or potential advantages may be further understood by way of reference to the various figures, which are discussed further below.

Figure 1:
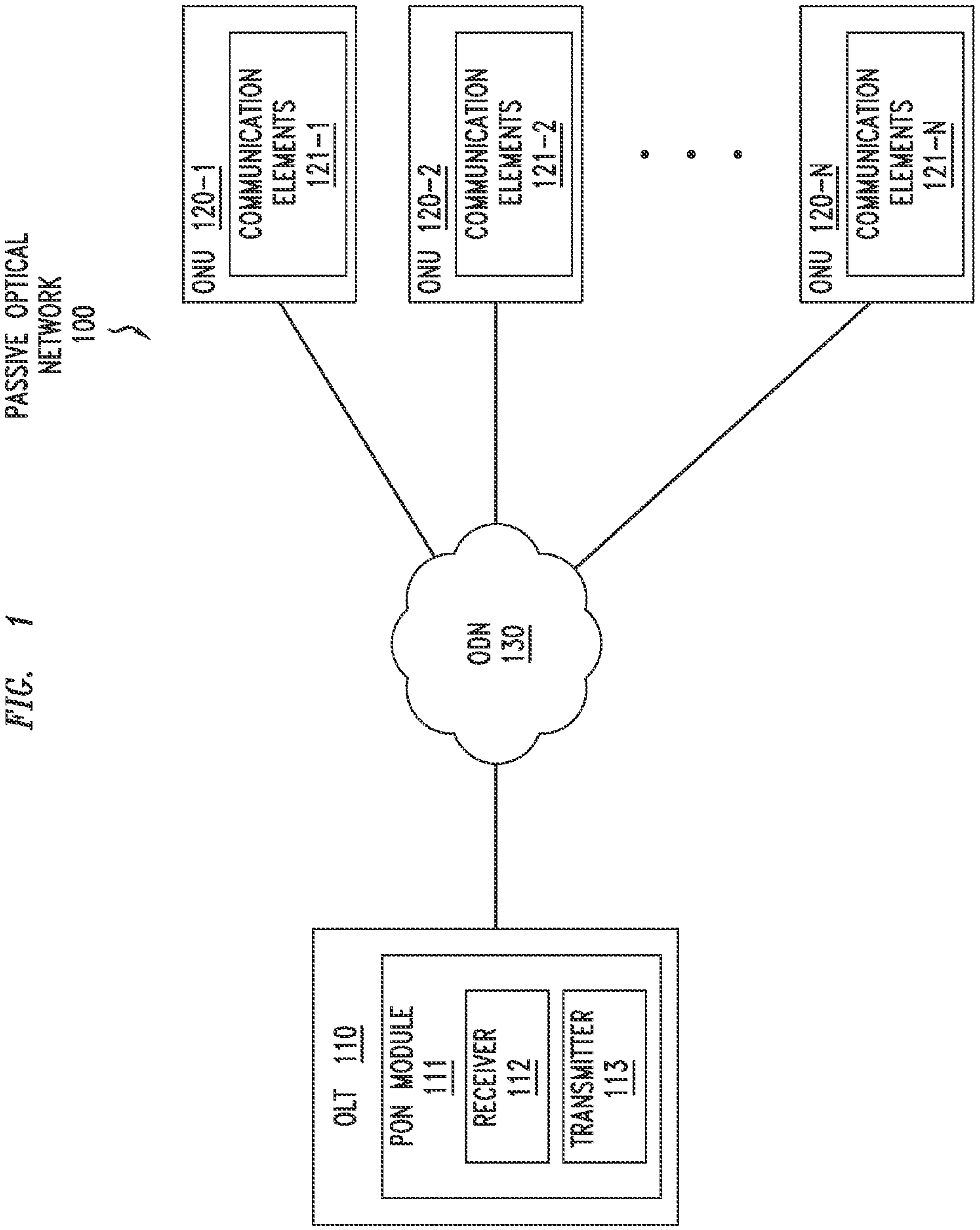
FIG. 1 depicts an example embodiment of a passive optical network (PON) that is configured to support communications between an optical line terminal (OLT) and optical network units (ONUs) where the OLT is configured to leverage fiber loss properties for improved optical communications by the OLT with the ONUs.

FIG. 1 depicts an example embodiment of a passive optical network (PON) that is configured to support communications between an optical line terminal (OLT) and optical network units (ONUs) where the OLT is configured to leverage fiber loss properties for improved optical communications with the ONUs.

The PON 100 is configured to use fiber-optic telecommunications technology for delivering broadband network access to end-customers for supporting communications for the end-customers. The PON 100 includes an optical line terminal (OLT) 110 and a set of optical network units (ONUs) 120-1-120-N (collectively, ONUs 120) connected via an optical distribution network (ODN) 130. The PON 100 may be configured to support downstream communications from the OLT 110 to the ONUs 120 via the ODN 130 and upstream communications from the ONUs 120 to the OLT 110 via the ODN 130. The PON 100 may be configured to operate using various types of PON technologies which may be based on various PON standards (e.g., Gigabit PON (GPON), 10 Gigabit Symmetrical PON (XGS-PON), or the like, as well as various combinations thereof). It will be appreciated that the PON 100 may include various other elements which have been omitted for purposes of clarity, may be based on various other PON technologies and/or standards, or the like, as well as various combinations thereof.

The PON 100 may be configured for various different applications. For example, the PON 100 may be configured to operate as an extended reach PON or a high margin PON. For example, an extended reach PON generally seeks to reach up to 60 kilometers (km) while also providing for the maximum possible split ratio at this extended reach (i.e., to achieve a maximum possible value of N for the number of ONUs 120). It is noted that reaches of other distances also may be used, including shorter distances to try to increase the value of N (e.g., 50 km, 40 km, 30 km, or the like, where a shorter length may be used to try to increase the value of N) or longer distances where lower values of N are acceptable (e.g., 70 km, 80 km, or the like). For example, a high margin PON is generally shorter range PON (e.g., typically not requiring an extended reach beyond 20 km, although longer ranges could be supported) that seeks to achieve a high link budget engineering margin to improve robustness (e.g., robustness to dirty connectors and/or poor splices, which can commonly occur in real PON systems). It is noted that a single splitter could be used or multiple splitters may be cascaded. It will be appreciated that the PON 100 may be configured in various ways (e.g., using particular OLT configurations for the OLT 110, using particular ONU configurations for the ONUs 120, using certain ODN classes for the ODN 130, or the like, as well as various combinations thereof) in order to support such PON applications.

The OLT 110 is configured to support communications between the ONUs 120 and one or more upstream networks (omitted for purposes of clarity). The OLT 110 may be located in a central location, such as a central office (CO), an outdoor enclosure, or other suitable location. For example, the one or more upstream networks may include one or more core communication networks configured to support communications of the OLT 110 and, thus, of the ONUs 120. For example, the OLT 110 may be configured to forward data received from the one or more upstream networks downstream toward the ONUs 120 via the ODN 130 and to forward data received from the ONUs 120 via the ODN 130 upstream toward the one or more upstream networks. The OLT 110 includes a PON module 111 configured to support communications of the OLT 110. The PON module 111 may be a single-PON module (SPM) configured to support a single PON (e.g., GPON or XGS-PON) or a multi-PON module (MPM) configured to support two or more PONs (e.g., a combination of GPON and XGS-PON). The PON module 111 may be implemented in various form factors, e.g., as a small form-factor pluggable (SFP) transceiver module (e.g., an SFP, a quad SFP (QSFP), a double-density SFP such as SFP-DD or QSFP-DD, or the like), as a module including a transmitter and a receiver, or the like. The PON module 111 may be configured in a manner that leverages fiber loss properties of optical fibers of the ODN 130 to provide improved reach and loss characteristics for the ODN 130 while reducing the cost and power consumption typically needed to achieve a given ODN class for the ODN 130. It will be appreciated that the OLT 110 may include various other elements for supporting communications with the ONUs 120.

The ONUs 120 each are configured to support communications between the OLT 110 and one or more downstream networks or devices (omitted for purposes of clarity). The ONUs 120 may be located at respective user premises or other suitable locations. For example, the one or more downstream networks or devices for an ONU 120 may include one or more local area networks (LANs) of the customer, one or more communication devices of the customer (e.g., a modem, a router, a switch, a set top box, a smart television, a gaming system, a computer, a smartphone, or the like, as well as various combinations thereof). For example, each of the ONUs 120 may be configured to forward data received from the OLT 110 via the ODN 130 downstream toward one or more downstream networks or devices and to forward data received from the one or more downstream networks or devices upstream toward the OLT 110 via the ODN 130. The ONUs 120 each may include one or more communication elements 121 (depicted as communication elements 121-1-121-N (collectively, communication elements 121) of ONUs 120-1-120-N, respectively) configured to support communications between the ONUs 120 and the OLT 110 (e.g., a transceiver, a transmitter, a receiver, or the like, as well as various combinations thereof). The ONUs 120 each may support various PON-related communication capabilities (e.g., PON-based transmission/reception capabilities, PON protocol encapsulation, or the like, as well as various combinations thereof). It will be appreciated that each of the ONUs 120 may include various other elements for supporting communications with the OLT 110.

The ODN 130 may be a data distribution system configured to support communications between the OLT 110 and the ONUs 120. The ODN 130 is depicted as being arranged in a branching configuration; however, it will be appreciated that various other P2MP configurations may be used. The ODN 130 may include various passive optical components (e.g., optical fibers, optical couplers, optical splitters, wavelength multiplexers/demultiplexers, and the like) which do not require power in order to support distribution of data signals between the OLT 110 and the ONUs 120; however, it will be appreciated that, in certain instances, the ODN 130 also may include active components to support communications between the OLT 110 and the ONUs 120 (e.g., optical amplifiers and the like). The ODN 130 may be configured to support various ODN classes, including ODN classes that may be standardized for PONs (e.g., ODN classes standardized by the ITU-T, such as Class A, Class B, Class B+, Class N1, Class N2, Class C, Class C+, Class D, Class E1, Class E2, or the like, including other classes currently standardized as well as other classes which may be developed and standardized (by the ITU-T and/or other standards organizations) in the future), ODN classes which are not standardized but are adopted or accepted by the industry (e.g., currently adopted or accepted classes and/or other classes that may be adopted or accepted in the future), or the like, as well as various combinations thereof. It will be appreciated that the ODN 130 may include various other elements for supporting communications between the OLT 110 and the ONUs 120.

Various example embodiments presented herein may be configured to achieve higher ODN classes (e.g., Class D, Class E1, Class E2, or the like) for various types of PON modules (e.g., SPMs, MPMs, or the like) and PON applications (e.g., extended-reach PON, high-margin PON, or the like) which may be utilized in various types of PON systems (e.g., XGS, GPON, XG(S)-PON, or the like). Various example embodiments presented herein may be configured to achieve higher ODN classes for various types of PON modules which may be utilized in various types of PONs in a manner tending to improve ODN reach and loss characteristics while achieving use of lower cost and lower power consumption solutions as compared with conventional approaches for PON systems. Various example embodiments presented herein may be configured to achieve higher ODN classes for various types of PON modules which may be utilized in various types of PONs by exploiting the asymmetry between downstream loss and upstream loss that may be present in single-mode fibers when the PON wavelengths are sufficiently separated, as may be the case in various types of PONs (e.g., XGS, GPON, XG(S)-PON, or the like). It will be appreciated that, while various example embodiments presented herein may be utilized to achieve various higher ODN classes in various types of PON modules in various types of PON systems, for purposes of clarity in describing various aspects of various example embodiments the various example embodiments are primarily presented herein within the context of supporting Class D MPMs within the context of an XG(S)-PON system. It will be appreciated that these and various other example embodiments may be further understood by first considering various aspects of PON systems, including fiber optic characteristics and ODN classes, more generally.

In PON systems, various types of OLT optical modules may be used. For example, OLT optical modules may include XGS and GPON OLT transceivers, which may be implemented as single-PON modules (SPMs) or as a multi-PON module (MPM). An MPM integrates the co-existence filtering within the optical module and provides a single receptacle to connect to the ODN. Higher loss ODN classes are usually accommodated by improving the specifications for the OLT optical module alone, allowing a common ONU variant to be used for all ODN classes. In PON systems, depending on the fiber length and the split ratio, various link budgets (ODN loss range) have been defined in ITU PON standards. The maximum loss for Class B+, Class C+, and Class D ODNs is 28 dB, 32 dB, and 35 dB, respectively. In PON systems, one important performance metric is the receiver sensitivity, which governs how low of a signal that can be detected. Based on various ODN classes, the XGS receiver sensitivity at the OLT for Class B+, Class C+, and Class D ODNs is −25 dBm, −29 dBm, and −32 dBm, respectively. In PON systems, another important performance metric is the transmit power at the OLT. The minimum transmit power at the OLT for Class B+, Class C+, and Class D ODNs is +1 dBm, +5 dBm, and +8 dBm, respectively.

In PON systems, a Class D OLT optical module is generally well-suited for both the extended reach PON and high margin PON applications discussed above. However, the issues with increasing the minimum transmit power for an electro-absorption modulated laser (EML) to achieve Class D include: (1) the required minimum Tx power of +8 dBm at high yield is difficult to reach, and (2) the dispersion tolerance for an EML tends to degrade due to higher chirp with increasing Tx power, resulting in a higher dispersion penalty at a given distance. To overcome these challenges, the conventional approach is to add an SOA post amplifier. However, an EML+SOA requires a production process that results in a larger and more complex device than an EML only; fewer devices are yielded per wafer, thereby increasing cost. In addition, an SOA requires an additional signal to bias the SOA. An SOA driver and an additional pin on the Tx TO is needed, further increasing the complexity and cost of a module. This results in a more expensive TO package or a TO package including another TO pin function, such as repurposing the laser monitor photodiode. Like an EML, an SOA must also be cooled, resulting in the need for a TEC with higher cooling capacity. The required power of an EML+SOA+TEC is typically a few hundred mW more than an EML only, resulting in a ~10-15% increase in power consumption for the optical module. Given that the power consumption of optical modules typically makes up ~50% of the total power consumption of an OLT, the overall OLT power consumption would increase by ~5-8% when using an EML+SOA, resulting in higher operational costs for operators.

Figure 2:
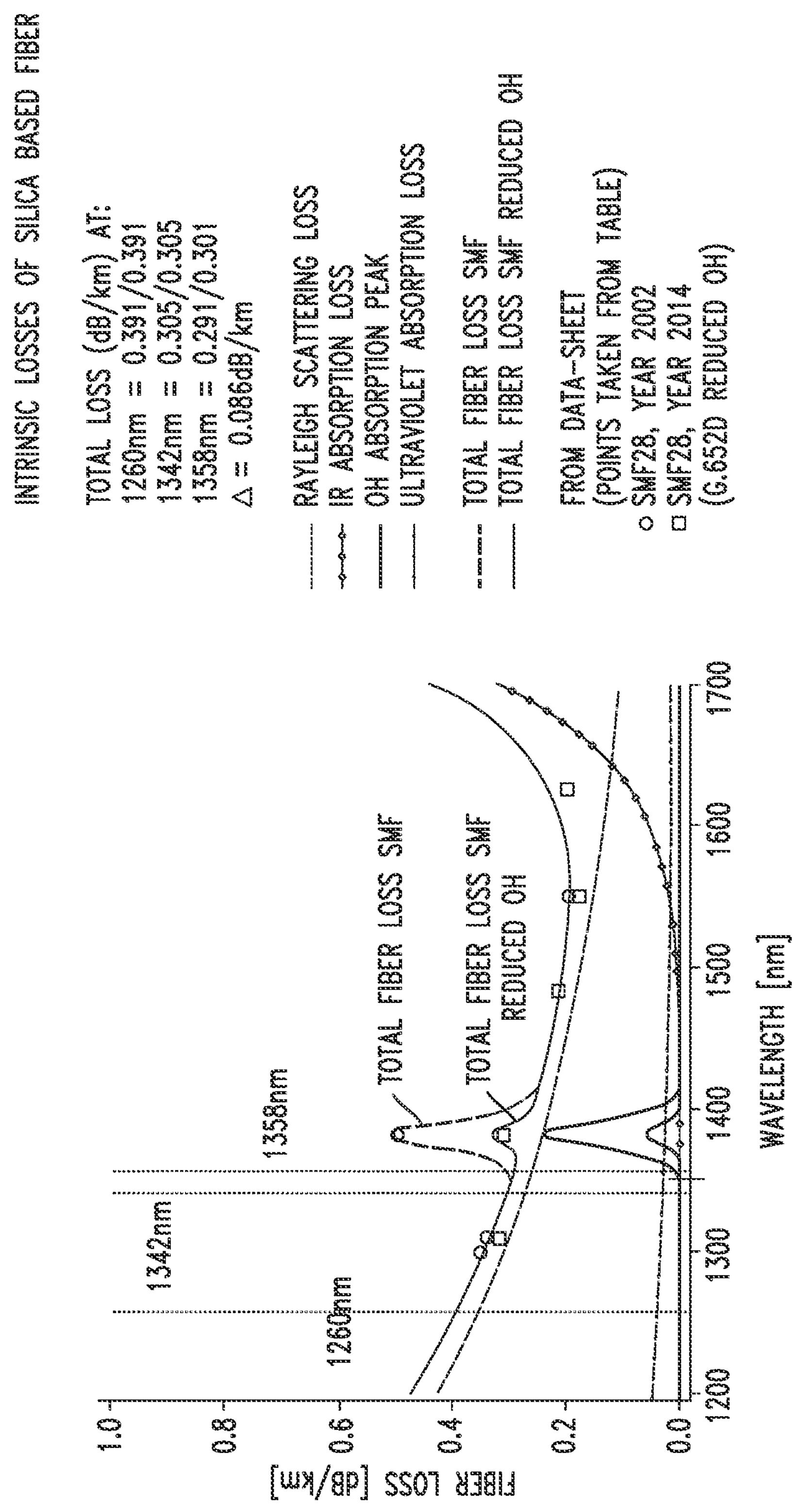
FIG. 2 depicts intrinsic losses of silica-based optical fibers at various wavelengths, for illustrating leveraging of fiber loss properties for improved optical communications by an OLT with ONUs.
Figure 3:
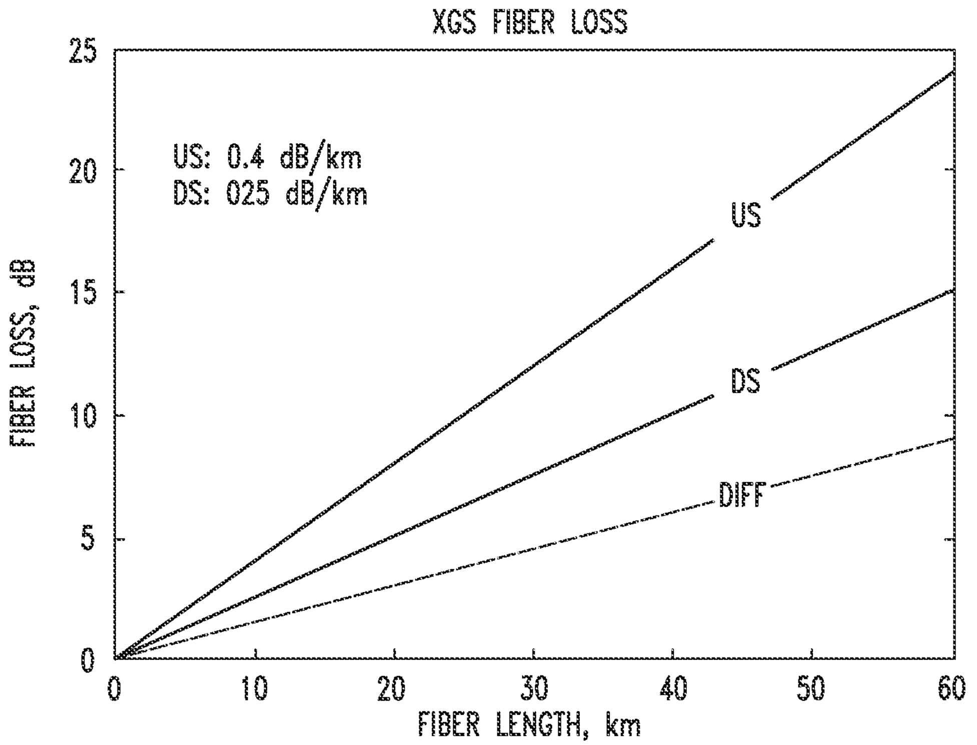
FIG. 3 depicts the asymmetry between downstream loss and upstream loss that may be present in single-mode fibers for certain PONs, for illustrating leveraging of fiber loss properties for improved optical communications by an OLT with ONUs.

In PON systems, a standard single mode fiber is often used in the ODN (e.g., bend-tolerant fiber types, such as those based on G.652, G,657, or the like). FIG. 2 depicts intrinsic losses of silica-based optical fibers, such as SSMFs, at various different wavelengths. As shown in FIG. 2, the intrinsic loss in the O-band is ~0.15 dB/km higher than the intrinsic loss in or near the C-band. As a result, at 20 km, 40 km, and 60 km, for XGS-PON, the additional loss in the upstream compared to the loss in the downstream is approximately 3 dB, 6 dB, and 9 dB, respectively, as shown in FIG. 3. The difference in loss for the downstream versus the loss for the upstream is due to the physical properties of SSMF and, thus, will be present in any SSMFs employed within ODNs. GPON wavelengths of 1490/1310 nm will give slightly less asymmetry in loss, e.g., closer to ~0.1 dB/km. It is noted that the optical path penalty (dispersion) mask is defined by ITU for DD20 and DD40 in G.9807.1Amd2, whereas for DD60 it is assumed that a penalty of up to 3 dB is allowed (not standardized) in the range (40-60] km. The resulting dispersion mask versus distance, and the residual link budget margin which may be defined, are illustrated in FIG. 4.

Figure 4:
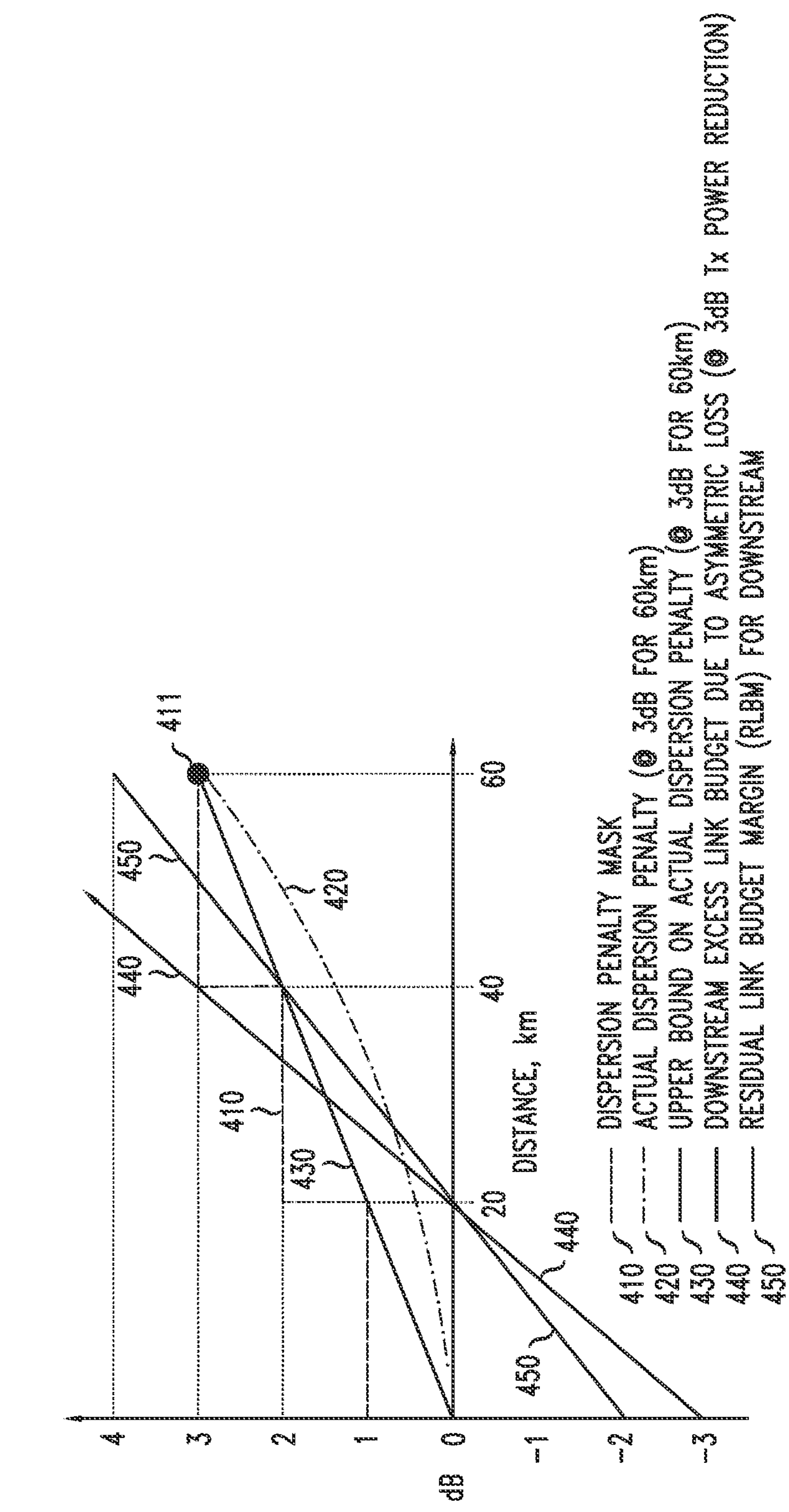
FIG. 4 depicts the residual link budget margin for downstream communications in a PON, for illustrating leveraging of fiber loss properties for improved optical communications by an OLT with ONUs.

FIG. 4 depicts the residual link budget margin for downstream communications in a PON, for illustrating leveraging of fiber loss properties for improved optical communications by an OLT with ONUs. The dispersion mask versus distance is shown by the staircase dashed line 410 in FIG. 4. Next, it is assumed that the actual dispersion at 60 km happens to be at the allowed limit of 3 dB, as shown by the point 411 in FIG. 4. It will be appreciated that, although the actual dispersion versus distance would have a convex shape, as shown by the curved dash-dot line 420 in FIG. 4, an upper bound for the path penalty versus distance can be assumed (shown by the solid linear line 430 between the origin (0 dB at 0 distance) and the point 411 in FIG. 4). The solid linear line 430 anchors the dispersion penalty versus distance to 0 dB and 3 dB at 0 km and 60 km, respectively, while also exactly intercepting the dispersion mask transition points at 20 km and 40 km (namely the transition points of the staircase dashed line 410). The solid line 440 in FIG. 4 shows the excess link budget in downstream due to asymmetric loss when the minimum transmit power is reduced by 3 dB. Hence, at 0 km, the excess link budget starts at −3 dB, but then increases with distance due to loss asymmetry in the fiber for downstream versus upstream. For example, at 20 km the loss asymmetry amounts to 3 dB, exactly canceling the impact of reducing the minimum transmit power by 3 dB. For the upstream, the maximum loss is always defined by the ODN class, and the OLT receiver sensitivity must meet the specification for a given class; however, for downstream, a resulting residual link budget margin (RLBM) is defined which accounts for the asymmetric fiber loss and a worst-case bound for optical path penalty, and where the minimum Tx power is reduced by 3 dB. This is shown as the solid line 450 in FIG. 4.

Based on FIG. 4, it will be appreciated that, for a Class D "Light" module based on various example embodiments presented herein (in contrast to a conventional Class D module), at 20 km the RLBM is exactly 0 dB, implying that the downstream and upstream link budgets are exactly balanced. For distances above 20 km, there is additional RLBM in the downstream compared to upstream due to the increasing loss asymmetry. Hence, for distances above 20 km, it is possible to achieve even higher ODN classes than Class D, provided that the OLT receiver sensitivity can be further improved, without having to increase the OLT minimum transmit power. Below 20 km, the downstream link budget is slightly reduced compared to conventional Class D modules, with the maximum reduction of 2 dB occurring at 0 km. However, respecting the applications in FIG. 1, as the fiber distance is reduced below 20 km, the physical fiber loss will decrease more than the RLBM, giving even more RLBM as compared to that achieved at 20 km.

Based on FIG. 4, compared to a conventional Class D module, a Class D "Light" module that is configured to leverage fiber loss properties may be calibrated during production with the following two differences from a typical Class D module: (1) the XGS transmit power is calibrated to meet a minimum of +5 dBm rather than +8 dBm typically specified for Class D ODNs and (2) the dispersion penalty is measured at 60 km to confirm it is less than or equal to 3 dB and, based on this one test point, the dispersion penalty is guaranteed to fall within the staircase dispersion penalty mask for all other distances up to 60 km, as explained above with respect to FIG. 4. As such, it is possible to specify a reduced OLT transmit power for a "Class D" MPM because (1) the applications of practical interest (namely, extended-reach PON and high-margin PON) do not require further increasing the OLT transmit power compared to Class C+, and (2) the reduced OLT transmit power avoids the need for an SOA post amp and the resulting drawbacks described herein (e.g., larger footprint, higher energy consumption, higher cost, and so forth).

Referring again to FIG. 1, and based on extrapolation of FIG. 4 to various ODN classes which may be supported by the ODN 130, the PON module 111 of the OLT 110 may be configured in a manner that leverages fiber loss properties of optical fibers of the ODN 130 to provide improved reach and loss characteristics for the ODN 130 while reducing the cost and power consumption typically needed to achieve a given ODN class for the ODN 130. The PON module 111 may include a receiver 112 configured to operate using a receiver sensitivity specified for an optical module class for PONs (e.g., specified by one or more ITU-T standards and/or other suitable standards, adopted or accepted by the industry but not standardized, or the like) and a transmitter 113 configured to operate using a transmit power that is less than a transmit power specified for the optical module class for PONs (e.g., specified by one or more ITU-T standards and/or other suitable standards, adopted or accepted by the industry but not standardized, or the like). The PON module 111 may be configured such that the dispersion penalty at a particular distance satisfies a particular threshold (e.g., a dispersion penalty at 60 km is less than or equal to 3 dB), and may be configured to support execution of a dispersion penalty test to ensure that the dispersion penalty at the particular distance satisfies the particular threshold. It will be appreciated that the configuration of the PON module 111 to support such features may be further understood based on further consideration of various specific ODN classes which may be supported by the ODN 130.

The PON module 111, in the case of Class D specified by the ITU-T standards for multi-PON modules, for example, may include a receiver 112 configured to use a receiver sensitivity specified by the ITU-T standards for Class D and a transmitter 113 configured to use a transmit power that is less than the transmit power specified by the ITU-T standards for Class D (e.g., using the transmit power of +5 dBm specified by the ITU-T standards for Class C+, rather than the transmit power of +8 dBm specified by the ITU-T standards for Class D). It will be appreciated that the transmit power does not necessarily need to correspond to the transmit power of the next lower ODN class in the hierarchy of ODN classes, but will be less than the transmit power specified by the ITU-T standards for Class D (e.g., the transmit power could correspond to a transmit power of a different ODN class lower in the hierarchy of ODN classes (e.g., Class C), a transmit power not necessarily specified for a particular ODN class in the ITU-T standards (e.g., a lower transmit power adopted or accepted by the industry or any other suitable lower transmit power), or the like). It is noted that such a PON module 111 may be referred to as a Class D "Light" module.

The PON module 111, in the case of Class D+ which may be developed and adopted by the industry even though not specified by the ITU-T standards, for example, may include a receiver 112 configured to use a receiver sensitivity specified or adopted by the industry for Class D+ and a transmitter 113 configured to use a transmit power that is less than the transmit power specified or adopted by the industry for Class D+ (e.g., using the transmit power of +8 dBm specified or adopted by the industry for Class D, rather than using a higher transmit power which may be specified or adopted by the industry for Class D+). It will be appreciated that the transmit power does not necessarily need to correspond to the transmit power of the next lower ODN class in the hierarchy of ODN classes, but will be less than the transmit power specified for Class D+ (e.g., the transmit power could correspond to a transmit power of a different ODN class lower in the hierarchy of ODN classes (e.g., Class C+, Class C, or the like), a transmit power not necessarily specified for a particular ODN class in the ITU-T standards (e.g., a lower transmit power adopted or accepted by the industry or any other suitable lower transmit power), or the like). It is noted that such a PON module 111 may be referred to as a Class D+ "Light" module.

The PON module 111, in the case of Class E1 specified by the ITU-T standards for example, may include a receiver 112 configured to use a receiver sensitivity specified by the ITU-T standards for Class E1 and a transmitter 113 configured to use a transmit power that is less than the transmit power specified by the ITU-T standards for Class E1 (e.g., using the transmit power specified by the ITU-T standards for Class N1 or Class N2 rather than using a higher transmit power which may be specified by the ITU-T standards for Class E1). It will be appreciated that the transmit power does not necessarily need to correspond to the transmit power of the next lower ODN class in the hierarchy of ODN classes, but will be less than the transmit power specified by the ITU-T standards for Class E1 (e.g., the transmit power could correspond to a transmit power of a different ODN class lower in the hierarchy of ODN classes (e.g., Class N1 or Class N2), a transmit power not necessarily specified for a particular ODN class in the ITU-T standards (e.g., a lower transmit power adopted or accepted by the industry or any other suitable lower transmit power), or the like). It is noted that such a PON module 111 may be referred to as a Class E1 “Light” module.

The PON module 111, in the case of Class E2 specified by the ITU-T standards for example, may include a receiver 112 configured to use a receiver sensitivity specified by the ITU-T standards for Class E2 and a transmitter 113 configured to use a transmit power that is less than the transmit power specified by the ITU-T standards for Class E2 (e.g., using the transmit power specified by the ITU-T standards for Class E1 rather than using a higher transmit power which may be specified by the ITU-T standards for Class E2). It will be appreciated that the transmit power does not necessarily need to correspond to the transmit power of the next lower ODN class in the hierarchy of ODN classes, but will be less than the transmit power specified by the ITU-T standards for Class E1 (e.g., the transmit power could correspond to a transmit power of a different ODN class lower in the hierarchy of ODN classes (e.g., Class N1 or Class N2), a transmit power not necessarily specified for a particular ODN class in the ITU-T standards (e.g., a lower transmit power adopted or accepted by the industry or any other suitable lower transmit power), or the like). It is noted that such a PON module 111 may be referred to as a Class E2 “Light” module.

The PON module 111, although primarily described as leveraging fiber loss properties of optical fibers of the ODN 130 for supporting specific ODN classes, may be configured to leverage fiber loss properties of optical fibers of the ODN 130 for supporting various other ODN classes, including various other ODN classes standardized by the ITU-T (Class A, Class B, Class B+, Class C, Class C+, or the like, as well as various combinations thereof), various other ODN classes which may be standardized by standards organizations other than ITU-T, various other ODN classes which may be adopted or accepted by the industry even though not standardized by any standards organization, or the like, as well as various combinations thereof.

The PON module 111, as indicated above, may be configured to leverage fiber loss properties of optical fibers of the ODN 130 for supporting various ODN classes which may utilize various transmit powers and receiver sensitivities. The configuration of the PON module 111 may include configuration or calibration of the transmitter 113 of the PON module 111 and configuration or calibration of the receiver 112 of the PON module 111. The transmitter 113 may be calibrated such that the chirp properties of the transmitting signal allows for passing the dispersion penalty over long fiber distances. For example, in the case of XGS, where Externally Modulated Lasers (EML) are used, the chirp properties of the transmitter 113 is related to the voltage applied on the electro absorption (EA) section of the EML. In parallel, the higher the EA voltage is set, the lower the output power of the EML will be. Thus, during calibration, the EA voltage will be set to largest possible negative values while the transmit power passes the minimum required output power. The receiver 112 may be configured or calibrated such that the receiver operates using the receiver sensitivity specified for the optical module class for the PON module 111. It will be appreciated that the configuration of the PON module 111 may be performed in other ways for leveraging fiber loss properties of optical fibers of the ODN 130 for supporting various ODN classes.

It will be appreciated that the PON 100, although primarily described with respect to specific types, numbers, and arrangements of elements, may be implemented using various other types of elements, various other numbers of elements, various other arrangements of elements, or the like, as well as various combinations thereof.

Figure 5:
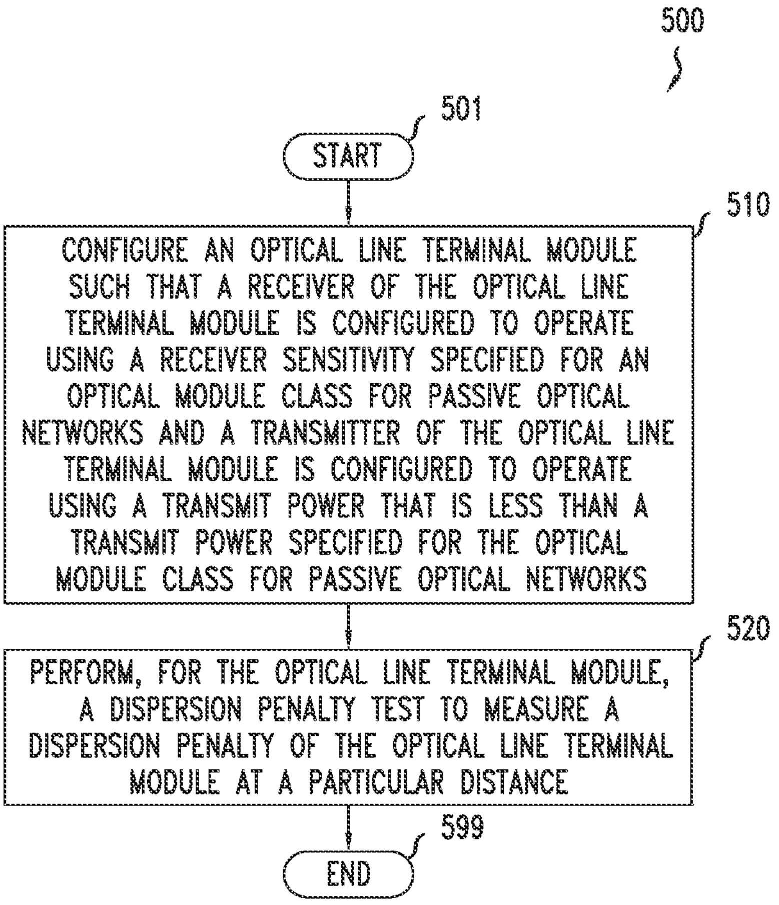
FIG. 5 depicts an example embodiment of a method for configuring an OLT module to leverage fiber loss properties for improved optical communications by the OLT with ONUs.

FIG. 5 depicts an example embodiment of a method for configuring an OLT module to leverage fiber loss properties for improved optical communications by the OLT with ONUs. It will be appreciated that, although primarily presented as being performed serially, at least a portion of the functions of the method 500 may be performed contemporaneously or in a different order than as presented with respect to FIG. 5. At block 501, method 500 begins. At block 510, configure an OLT module such that a receiver of the OLT module is configured to operate using a receiver sensitivity specified for an optical module class for passive optical networks and a transmitter of the OLT module is configured to operate using a transmit power that is less than a transmit power specified for the optical module class for passive optical networks. At block 520, perform, for the OLT module, a dispersion penalty test to measure a dispersion penalty of the OLT module at a particular distance. At block 599, the method 500 ends. It will be appreciated that various functions presented herein with respect to FIG. 1 may be incorporated within the context of the method 500 of FIG. 5.

Figure 6:
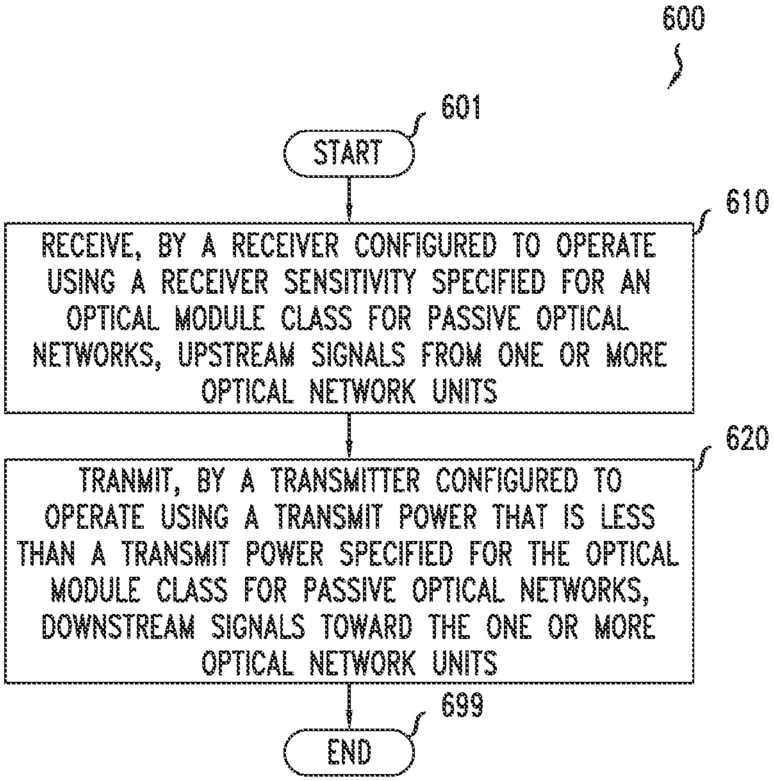
FIG. 6 depicts an example embodiment of a method for using an OLT module, which is configured to leverage fiber loss properties for improved optical communications by the OLT with ONUs, for supporting communications by the OLT with ONUs.

FIG. 6 depicts an example embodiment of a method for using an OLT module, which is configured to leverage fiber loss properties for improved optical communications by the OLT with ONUs, for supporting communications by the OLT with ONUs. It will be appreciated that, although primarily presented as being performed serially, at least a portion of the functions of the method 600 may be performed contemporaneously or in a different order than as presented with respect to FIG. 6. At block 601, method 600 begins. At block 610, receive, by a receiver configured to operate using a receiver sensitivity specified for an optical module class for passive optical networks, upstream signals from one or more optical network units. At block 620, transmit, by a transmitter configured to operate using a transmit power that is less than a transmit power specified for the optical module class for passive optical networks, downstream signals toward the one or more optical network units. At block 699, the method 600 ends. It will be appreciated that various functions presented herein with respect to FIG. 1 may be incorporated within the context of the method 600 of FIG. 6.

Various example embodiments for supporting optical communications using optical modules configured based on exploitation of fiber loss properties may provide various advantages or potential advantages. For example, various example embodiments for supporting optical communications using optical modules configured based on exploitation of fiber loss properties may be configured to support improved ODN reach and loss characteristics using lower cost and lower power consumption solutions as compared with convention solutions for PON systems. For example, various example embodiments for supporting optical communications using optical modules configured based on exploitation of fiber loss properties may be configured to achieve higher-loss ODN classes by only improving the receiver sensitivity of the OLT receiver, without having to increase the transmitter output power of the OLT transmitter, thereby enabling significant reductions in OLT optical module power dissipation and cost. For example, various example embodiments for supporting optical communications using optical modules configured based on exploitation of fiber loss properties may be configured to achieve higher-loss ODN classes by only improving the receiver sensitivity of the OLT receiver and retaining the transmitter output power of the OLT transmitter of lower-loss ODN classes (e.g., the OLT transmit power specification for an Class D ODN can be kept the same as for Class C+ so as to provide a Class D "Light" optical module, the OLT transmit power specification for a Class E1 ODN or Class E2 ODN can be kept the same as for a Class N1 ODN or Class N2 ODN so as to provide a Class E1 "Light" optical module or a Class E2 "Light" optical module, and so forth), thereby enabling significant reductions in OLT optical module power dissipation and cost. For example, various example embodiments for supporting optical communications using optical modules configured based on exploitation of fiber loss properties may be configured to achieve higher ODN classes (e.g., Class D. Class E2, or other ODN classes with relatively high ODN loss) for various types of PON modules (e.g., SPMs, MPMs, or the like) and PON applications (e.g., extended-reach PON, high-margin PON, or the like) which may be utilized in various types of PON systems (e.g., XGS, GPON, XG(S)-PON, or the like) while using lower cost and lower power consumption solutions as compared with conventional approaches (e.g., obviating the need to increase transmit power and obviating the need for an SOA post amplifier). For example, various example embodiments for supporting optical communications using optical modules configured based on exploitation of fiber loss properties may be configured to exploit the asymmetry between downstream loss and upstream loss that may be present in single-mode fibers when PON wavelengths are sufficiently separated, which may be the case for GPON and XG(S)-PON, making the approach suitable for improving ODN reach and loss for various types of PON modules which may be deployed in various types of PONs (e.g., XG(S) and/or GPON single-PON modules, XG(S)+GPON MPMs, potential future MPMs that may integrate GPON and/or XG(S)-PON with a future higher-speed PON such as 25 G PON or 50 G PON, or the like, as well as various combinations thereof). It will be appreciated that various example embodiments for supporting optical communications using optical modules configured based on exploitation of fiber loss properties may provide various other advantages or potential advantages.

Figure 7:
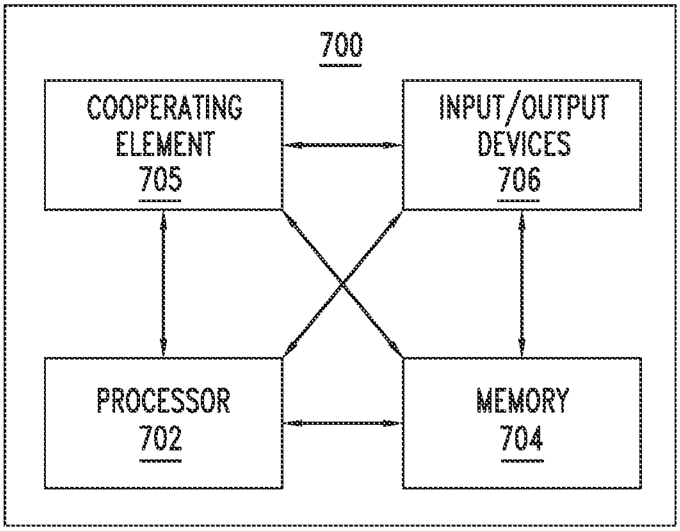
FIG. 7 depicts an example embodiment of a computer suitable for use in performing various functions presented herein.

FIG. 7 depicts an example embodiment of a computer suitable for use in performing various functions presented herein.

The computer 700 includes a processor 702 (e.g., a central processing unit (CPU), a processor, a processor having a set of processor cores, a processor core of a processor, or the like) and a memory 704 (e.g., a random access memory (RAM), a read-only memory (ROM), or the like). In at least some example embodiments, the computer 700 may include at least one processor and at least one memory storing instructions that, when executed by the at least one processor, cause the computer to perform various functions presented herein.

The computer 700 also may include a cooperating element 705. The cooperating element 705 may be a hardware device. The cooperating element 705 may be a process that can be loaded into the memory 704 and executed by the processor 702 to implement various functions presented herein (in which case, for example, the cooperating element 705 (including associated data structures) can be stored on a non-transitory computer readable medium, such as a storage device or other suitable type of storage element (e.g., a non-volatile memory (e.g., flash memory, erasable programmable read-only memory (EPROM), or the like), a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 may represent a general architecture and functionality suitable for implementing functional elements described herein, portions of functional elements described herein, or the like, as well as various combinations thereof. For example, the computer 700 may provide a general architecture and functionality that is suitable for implementing one or more elements presented herein. For example, the computer 700 may provide a general architecture and functionality that is suitable for implementing at least one of an OLT or a portion thereof, an OLT optical module or a portion thereof, an ONU or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus configured for communication in a passive optical network, the apparatus comprising:

a receiver configured to operate to receive upstream optical signals, in an upstream direction from a set of optical network units of the passive optical network, using a receiver sensitivity specified for an optical module class for passive optical networks; and a transmitter configured to operate to transmit downstream optical signals, in a downstream direction toward the set of optical network units of the passive optical network, using a transmit power that is less than a specified transmit power specified for the optical module class for passive optical networks, wherein the transmit power is based on a residual link budget margin that accounts for an asymmetric fiber loss between the downstream direction and the upstream direction and for a dispersion penalty, wherein the transmit power is based on a second specified transmit power specified for a second optical module class for passive optical networks.

2. The apparatus of claim 1, wherein the dispersion penalty, at a particular distance, is equal to or less than a maximum specified value.

3. The apparatus of claim 1, wherein the apparatus is configured to support execution of a dispersion penalty test to measure the dispersion penalty at a particular distance.

4. The apparatus of claim 3, wherein the dispersion penalty test is configured to confirm that the dispersion penalty at the particular distance is equal to or less than a maximum specified value.

5. The apparatus of claim 1, wherein the optical module class for passive optical networks comprises one of Class A, Class B, Class B+, Class N1, Class N2, Class C, Class C+, Class D, Class E1, or Class E2.

6. The apparatus of claim 1, wherein the optical module class for passive optical networks comprises Class D, wherein the specified transmit power specified for Class D is +8 dBm, wherein the transmitter is configured to operate using a transmit power of +5 dBm.

7. The apparatus of claim 1, wherein the apparatus comprises a passive optical network module.

8. The apparatus of claim 7, wherein the passive optical network module is configured to support a single passive optical network.

9. The apparatus of claim 7, wherein the passive optical network module is configured to support multiple passive optical networks.

10. The apparatus of claim 1, wherein the apparatus comprises an optical line terminal for a passive optical network.

11. A method for communication in a passive optical network, comprising:

receiving, by a receiver configured to operate using a receiver sensitivity specified for an optical module class for passive optical networks, upstream signals in an upstream direction from a set of optical network units of the passive optical network; and transmitting, by a transmitter configured to operate using a transmit power that is less than a specified transmit power specified for the optical module class for passive optical networks, downstream signals in a downstream direction toward the set of optical network units of the passive optical network, wherein the transmit power is based on a residual link budget margin that accounts for an asymmetric fiber loss between the downstream direction and the upstream direction and for a dispersion penalty, wherein the transmit power is based on a second specified transmit power specified for a second optical module class for passive optical networks.

12. The method of claim 11, wherein the dispersion penalty, at a particular distance, is equal to or less than a maximum specified value.

13. The method of claim 11, further comprising:

supporting execution of a dispersion penalty test to measure the dispersion penalty at a particular distance.

14. The method of claim 13, wherein the dispersion penalty test is configured to confirm that the dispersion penalty at the particular distance is equal to or less than a maximum specified value.

15. The method of claim 11, wherein the optical module class for passive optical networks comprises one of Class A, Class B, Class B+, Class N1, Class N2, Class C, Class C+, Class D, Class E1, or Class E2.

16. The method of claim 11, wherein the optical module class for passive optical networks comprises Class D, wherein the specified transmit power specified for Class D is +8 dBm, wherein the transmit power is +5 dBm.

17. The method of claim 11, wherein the method is performed by a passive optical network module.

18. The method of claim 17, wherein the passive optical network module is configured to support a single passive optical network.

19. The method of claim 17, wherein the passive optical network module is configured to support multiple passive optical networks.

20. The method of claim 11, wherein the method is performed at an optical line terminal for a passive optical network.

* * * * *